Figure 1:
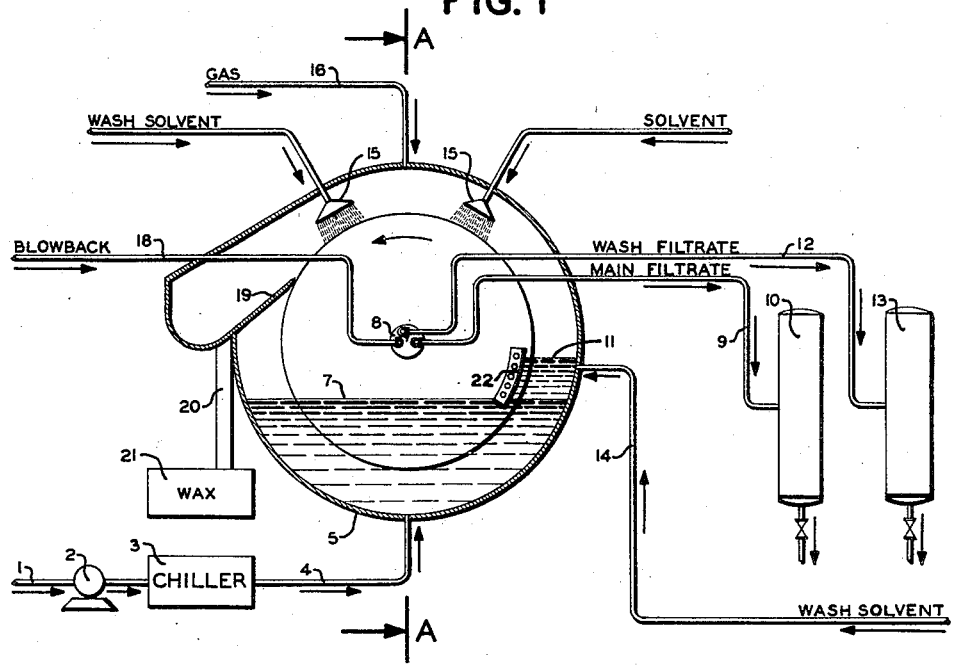

WYNKOOP KIERSTED JR.
INVENTOR

Patented Feb. 8, 1944

2,341,045

UNITED STATES PATENT OFFICE 2,341,045

FILTRATION

Wynkoop Kiersted, Jr., Scarsdale, N. Y., assignor, by mesne assignments, to The Texas Company, New York, N. Y., a corporation of Delaware Application August 17, 1939, Serial No. 290,599

6 Claims. (Cl. 210—199)

This invention relates to the separation of solids from a mixture of solids and liquid, such as the separation of solidified wax from a wax-bearing oil mixture, by filtration.

The invention has to do with filtration by a continuous rotary type of filter wherein a rotary filter element consecutively submerges within a body of solids and liquid maintained within the filter bowl during which a filter cake of solids is formed and then emerges from the mixture of solids and liquid, after which the cake is washed, dried and discharged from the filter element.

According to the present invention, the filter element bearing the filter cake, upon emergence from the mixture of solids and liquid, is passed through a body of wash solvent floating upon the surface of the body of solids and liquid contained within the filter bowl.

The invention is particularly applicable to the dewaxing of wax-bearing oil and has for its object provision for washing the wax cake derived from a stock which may filter very freely but produces a filter cake that, after emerging from the liquid, is quite impervious to the penetration of a wash solvent as conventionally applied.

The invention is particularly useful with a rotary drum type of filter comprising a horizontal, cylindrical filter drum rotatably supported within a filter bowl or shell and arranged for partial submergence within the body of solids and liquid to be filtered.

The invention contemplates providing fins rigidly attached to the interior of each end of the filter bowl and in slidable contact with the adjacent ends of the horizontal rotary filter drum. The fins are advantageously placed in a vertical position near the peripheral portion of the rotary element emerging from the body of solids and liquid and thus arranged to seal the space between the filter bowl and ends of the filter drum for a substantial distance below the surface of the liquid body within the bowl of the filter. For example, these fins may extend a distance below the liquid level equal to about one-quarter of the diameter of the filter drum. In this way a channel is provided in which a body of wash solvent of substantial depth may be maintained upon the surface of the body of solids and liquid and adjacent the emerging filter surface upon which the filter cake is deposited.

The filter surface bearing the filter cake emerges from the mixture of solids and liquid and passes into and through this floating body of wash solvent. During passage of the filter cake through the body of wash solvent a continuous film or layer of the solvent is drawn into the cake and later into the interior of the filter drum from which it is removed as a wash filtrate in the conventional manner. Provision is made for supplying additional wash solvent to compensate for the solvent drawn into and through the filter cake.

An object of the invention is to maintain a continuous fluid phase condition in the region adjacent the surface of the cake during cake forming and the early portion of the washing cycle by subjecting the filter cake to contact with a substantial body of wash solvent immediately as it rises from the mixture being filtered and before entering the gaseous phase region above the liquid level and within the filter shell. Ordinarily, as the filter cake emerges from the mixture being filtered it comes into a washing zone where provision is made for subjecting the cake to a spray of wash solvent. However, with certain types of waxes a surface sealing effect may result, due to surface tension of the liquid or other cause, when the cake emerges from the liquid being filtered. The surface sealing appears to be due to bending over of the fine, flexible ends of wax crystals so as to close the interstices between crystals, thus preventing subsequent flow of wash solvent into the cake. Therefore, the purpose of this invention is to introduce a layer of wash solvent into the cake before any external force can be applied to the wax crystals that will cause them to seal the surface of the cake.

The present invention accomplishes this by maintaining a body of wash solvent upon the surface of the mixture being filtered so as to saturate the cake with a continuous film of solvent, before emerging from the liquid bowl, which film will serve to wash out of the cake the oil solution originally included in the cake as it formed upon the filtering medium. Thus, true liquid displacement, using solvent liquid as the displacing medium, is provided for in the early stages of cake washing and drying. Thereafter, the cake may be subjected to the conventional type of spray washing, followed by air or gas drying prior to discharge from the filter.

In order to describe the invention further reference will now be made to the accompanying drawing.

Referring to Fig. 1 of the drawing, a wax-bearing oil mixture, comprising wax-bearing oil mixed with a dewaxing solvent in the proper proportion, is drawn from a source not shown through a pipe 1 and forced by a pump 2 through a chiller 3. The chilled mixture, at a temperature which may range from around 0° F. to minus 20° F. and lower, is passed through a pipe 4 to the bowl of a filter 5. The filter 5 is preferably of the rotary drum type, having a cylindrical rotary filter element 6 partially submerged in the chilled wax-bearing mixture, the surface of which within the filter bowl 5 is indicated at 7.

As indicated, the cylindrical filter element rotates in a counter clock-wise direction and as it submerges within the mixture being filtered, filtrate is drawn into the interior of the filter element, due to the reduced pressure existing therein, and discharged through a filter valve 8, comprising the hub which supports the drum within the filter bowl.

The filtrate is discharged from the filter valve through a pipe 9 leading to a receiving tank 10.

During submergence solid wax is deposited upon the submerged portion of the filter surface. During continued rotation of the drum 6 the filter cake emerges from the filtering mixture and passes into the floating bath 11, comprising chilled solvent liquid, at about the same temperature as the mixture being filtered. During passage through the bath 11 a part of the solvent liquid comprising this bath is drawn through the filter cake as a wash filtrate which is discharged through the filter valve via a pipe 12, which leads to a wash filtrate tank 13. Makeup wash solvent is supplied through a pipe 14.

Upon further rotation the filter cake emerges from the floating bath of wash solvent and comes into the upper portion of the filter shell, wherein it is subjected to a spray wash supplied by sprays 15. The solvent from the sprays 15 passes through the filter cake into the interior of the filter drum and is subsequently removed as wash filtrate.

Gas is introduced to the filter shell through a pipe 16 and this gas may be cooled so as to maintain a sufficiently low temperature within the filter shell. In this way the unsubmerged portion of the filter surface and filter cake may be maintained at or near the temperature of the filtering mixture within the filter bowl.

With further rotations the washed filter cake is subjected to drying, due to the suction of gas through it and eventually the filter fabric bearing the dried cake is subjected to a reverse pressure. This is accomplished by introducing blowback gas through a pipe 18 which communicates with the filter valve 8. The introduction of this blowback gas causes the filter fabric bearing the cake to bulge outwardly, and thus facilitates removal of the cake from the filter surface by a blade 19.

The dislodged cake is discharged into a chute 20 which communicates with a receiving tank 21.

Figure 2:
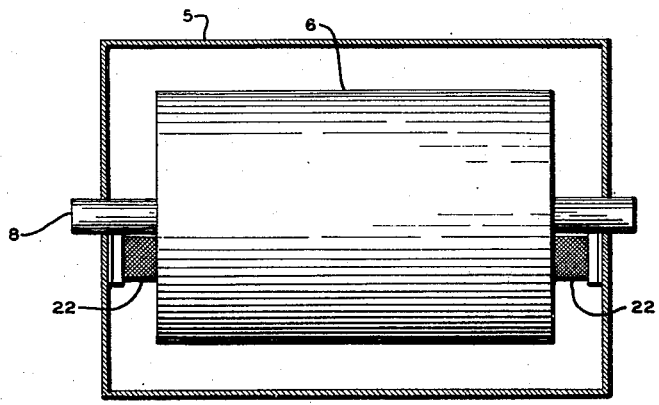

The floating body of wash solvent is confined to that side of the filter bowl in which the filter surface rises from the mixture being filtered by fins 22, which are also shown in Fig. 2.

Fig. 2 comprises a vertical sectional view of the filter through the section AA. The fins are rigidly attached to the interior of the ends of the bowl 5 and their free edges extend inwardly against the outer surfaces of the adjacent ends of the filter drum 6.

These fins may comprise a heavy, stiff fabric material attached to angle irons welded to the ends of the filter bowl 5.

The free edges of the fins are adapted to bear tightly against the ends of the drum 6 so as to provide a slidable contact under sufficient tension to provide a liquid seal and thus confine the floating body of wash solvent to that side of the filter bowl remote from the point of cake discharge.

The wax-bearing oil undergoing dewaxing, as described above, may comprise a distillate or residual type of lubricating oil stock. The dewaxing solvent may be a selective type of solvent, such as a mixture of about 40% methyl ethyl ketone and 60% commercial benzol. Other selective solvents, or solvent mixtures, now known and used in the art may be employed.

Obviously many modifications and variations of the invention, as hereinbefore set forth, may be made without departing from the spirit and scope thereof, and therefore only such limitations should be imposed as are indicated in the appended claims.

I claim:

1. In the continuous process of dewaxing mineral oil by continuously filtering a chilled mixture of wax-bearing oil and dewaxing solvent, and wherein a filter surface consecutively submerges within a body of the chilled mixture maintained within the filter bowl, during which a wax filter cake is formed and then emerges from the body of chilled mixture, after which the cake is washed, dried and discharged from the filter, the method of washing the cake comprising surrounding the cake at the point of emergence from the body of chilled mixture with a body of wash solvent, subjecting the filter surface to a pressure differential during passage through the surrounding body of wash solvent, whereby solvent is passed through the cake to displace retained oil from the cake as filtrate, and subjecting the cake to spraying with wash solvent upon emergence from the surrounding body of wash solvent.

2. In the dewaxing of wax-bearing oil by continuously filtering a chilled mixture of wax-bearing oil and solvent through a filter surface which consecutively submerges within the chilled mixture, during which formation of a wax filter cake occurs and then emerges from the chilled wax-bearing mixture, after which the cake is washed, dried and discharged therefrom the method which comprises continuously passing the chilled mixture of wax-bearing oil and solvent to the bowl of a continuous filter, maintaining a body of said mixture within the bowl sufficient to submerge a substantial portion of the filter surface, subjecting the filter surface to a pressure differential whereby liquid is drawn into the interior thereof as filtrate and wax is deposited upon the exterior thereof as a cake, maintaining upon the surface of the body of chilled wax-bearing mixture and adjacent the emerging filter cake, a floating body of wash solvent liquid, and continuing said pressure differential during passage of the filter cake through said floating body of wash solvent, whereby the solvent is drawn through the cake to displace retained oil therefrom as filtrate.

3. In the dewaxing of wax-bearing oil by continuously filtering a chilled mixture of wax-bearing oil and solvent through a filter surface which consecutively submerges within the chilled mixture, during which formation of a wax filter cake occurs and then emerges from the chilled wax-bearing mixture, after which the cake is washed, dried and discharged therefrom the method which comprises continuously passing the chilled mixture of wax-bearing oil and solvent to the bowl of a continuous filter, maintaining a body of said mixture within the bowl, sufficient to submerge a substantial portion of the filter surface, subjecting the filter surface to a pressure differential whereby liquid is drawn into the interior thereof as filtrate and wax is deposited upon the exterior thereof as a cake, maintaining upon the surface of the body of chilled wax-bearing mixture and adjacent the emerging filter cake a floating body of cold wash solvent liquid, continuing said pressure differential whereby solvent is drawn through the cake to displace retained oil therefrom as filtrate, and subjecting the wax cake to a spray of wash solvent, after emerging from the floating body of wash solvent, while continuing said pressure differential.

4. The method of separating wax from oil by continuous filtration wherein a rotating hollow filter element consecutively submerges within and emerges from a mixture undergoing filtration which comprises passing said filter element through a feed slurry containing precipitated wax, oil and a solvent for oil constituents of said slurry, forming a wax cake thereon and withdrawing a filtrate of oil and solvent through the filter element for discharge therefrom, without intervening emergence passing the element bearing the wax cake through a body of liquid, which body varies from feed slurry consistency to solvent consistency, withdrawing filtrate through the cake and filter element during passage through said body, supplying solvent to said body, then passing the filter element and adherent wax cake from the body of liquid, subsequently applying a fresh quantity of solvent to the emerged cake-bearing element to wash the cake and withdrawing wash filtrate through the cake and filter element for discharge therefrom.

5. The method of separating wax from oil by continuous filtration wherein a rotating hollow filter element consecutively submerges within and emerges from a mixture undergoing filtration which comprises admixing with the wax and oil a solvent for the oil at low temperatures, chilling the mixture to precipitate wax therefrom, bringing the mixture into contact with a submerged filtering element to form a wax filter cake thereon while a filtrate of oil and solvent is drawn through the element for discharge therefrom, passing the filter element and the formed wax filter cake without intervening emergence through a zone containing a body of liquid, which liquid is of substantially solvent consistency at least at and immediately prior to the point of filter cake emergence from said zone, supplying solvent to said body, withdrawing filtrate through the cake and filter element during passage through said zone, then passing the filter element and formed cake from the body of liquid, subsequently washing the emerged cake with a solvent for oil and withdrawing wash filtrate through the cake and filter element.

6. The method of separating wax from oil by continuous filtration wherein a rotating hollow filter element consecutively submerges within and emerges from a mixture undergoing filtration which comprises admixing with the wax and oil a solvent for oil at low temperatures, chilling the mixture to precipitate wax therefrom, bringing the mixture into contact with a submerged filtering element to form a wax filter cake thereon while a filtrate of oil and solvent is drawn through the filter element for discharge therefrom, passing the filter element and the formed wax cake without intervening emergence through a zone containing a body of liquid comprising oil, wax and solvent, supplying an additional quantity of said solvent to said zone in an amount sufficient to maintain the liquid therein of substantially solvent consistency at least at and immediately prior to the point of filter cake emergence from said zone, withdrawing filtrate through the cake and filter element during passage through said zone, then passing the filter element and formed cake from said zone, subsequently washing the emerged cake with solvent for oil and withdrawing a filtrate of wash solvent through the cake and filter element.

WYNKOOP KIERSTED, Jr.